Sept. 22, 1970   KAIJI NEGORO   3,529,801
FEED RATE CONTROL FOR AUTOMATIC TRACER MECHANISM
Filed Sept. 19, 1968   3 Sheets-Sheet 2
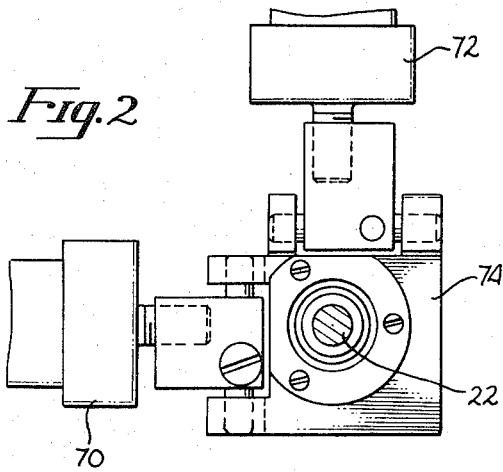
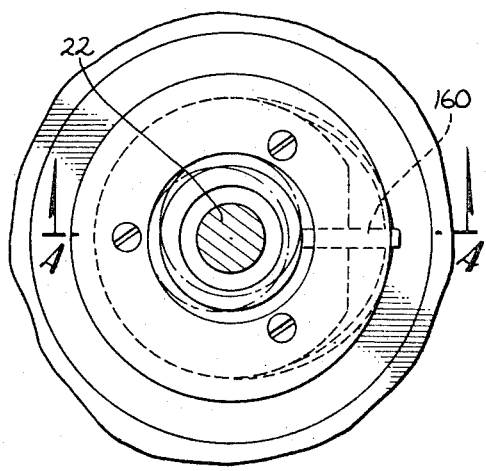
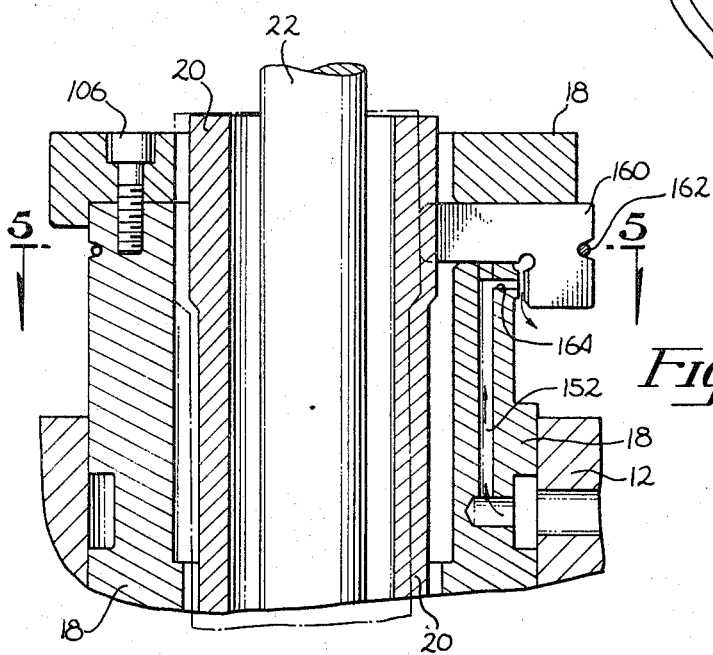
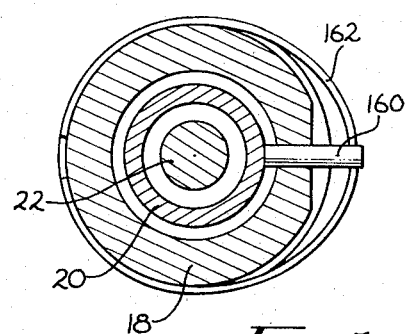
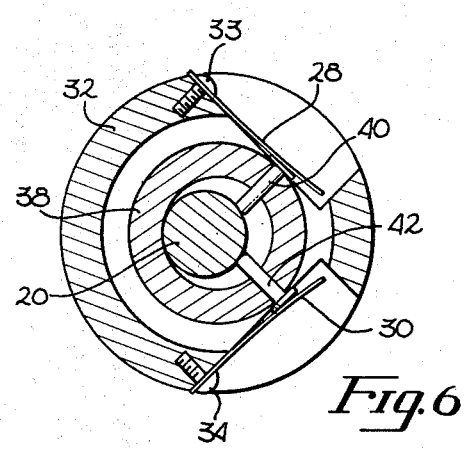
KAIJI NEGORO
INVENTOR.
BY Jessup & Beecher
Warren T. Jessup
ATTORNEYS

United States Patent Office 3,529,801
Patented Sept. 22, 1970

3,529,801
FEED RATE CONTROL FOR AUTOMATIC TRACER MECHANISM

Kaiji Negoro, Montebello, Calif., assignor to Whittaker Corporation, Los Angeles, Calif., a corporation of California
Filed Sept. 19, 1968, Ser. No. 760,909
Int. Cl. B23q *35/16*
U.S. Cl. 251—3  7 Claims

ABSTRACT OF THE DISCLOSURE

A feed rate adjustment control is provided for a spindle-type machine tool tracer valve mechanism; the tracer valve mechanism being of the type which is characteristically used as a control for a machine tool, in which the workpiece and the cutting tool are shifted relative to one another for the purpose of duplicating the countour of a template which is engaged by the spindle in the workpiece. The feed rate adjustment control of the invention permits the operator to set the tracter valve mechanism at different feed rates for a given deflection of the spindle, and it is particularly adapted to the automatic type of tracer valve mechanism.

BACKGROUND OF THE INVENTION

Automatic tracer valve control mechanisms are described, for example, in Rosebrook Pat. 3,006,595 and 2,909,357. As described in the said patents, the actuating control of the tracer valve assembly under consideration is a spindle or stylus which is moved automatically along the contour of a template or pattern, the shape of which is to be duplicated by the machine tool on the workpiece.

In operating the usual type of prior art tracer valve mechanism, a bias force is exerted on the tip of the stylus to tilt the stylus towards the edge of the template. The stylus deflecting bias action serves to adjust the posiions of servo hydraulic valves within the tracer mechanism, and these hydraulic valves regulate the flow of pressurized fluid to appropriate hydraulic servo motors. The servo motors shift the workpiece and cutting tool relative to one another.

In the prior art automatically controlled tracer valve mechanism, a pair of valves are usually included for controlling the application of power to the drive mechanism which controls the relative positions of the workpiece and cutting tool. These two valves are mechanically coupled to the aforesaid stylus so that the application of power to the drive mechanism is dependent upon the stylus deflection. Each of the valves controls movement along one of two axes which are mutually perpendicular to one another. A resilient bias is applied to the stylus, and a turning motor is provided for turning the assembly so that the stylus is biased, for example, at 45° to its point of contact with the template. This means that the stylus not only is biased against the edge of the template, but is also caused to move along the edge and around the template. Any tendency for the forces exerted on the stylus to change from the 45° angle, sets up a compensating servo control on the turning motor to maintain the designed 45° angle.

The present invention provides a simple manual adjustment control for use in such an automatic tracer valve assembly, and which permits the operator to adjust the feed rate, that is the rate at which the stylus proceeds around the edge of the template and thus the rate at which the cutting tool machines the workpiece, this being achieved without changing the actual stylus deflection or otherwise interfering in any way with the automatic control of the assembly.

SUMMARY OF THE INVENTION

An extensible rod is provided in a tracer valve assembly of the type discussed above, the rod being disposed in telescoping coaxial relationship with the upper end of the main stylus or spindle. The main stylus of the tracer valve is deflected through fixed limits. However, as the extensible rod is extended to different positions, the control exerted on the hydraulic control valves by deflections of the stylus is increased proportionally, even though the deflection limits of the stylus remain fixed.

BRIEF DESCRIPTION OF THE DRAWINGS

FIG. 2 is a cross-sectional view of the assembly of FIG. 1, taken essentially along the line 2—2 of FIG. 1;

FIG. 3 is a further cross-section of the assembly of FIG. 1, taken substantially along the line 3—3 of FIG. 1;

FIG. 4 is a partial side section taken along the line 4—4 of FIG 3;

FIG. 5 is a further cross-section taken along the line 5—5 of FIG. 4, but on a reduced scale with respect to FIG. 4;

FIG. 6 is a further cross-section taken on the line 6—6 of FIG. 1;

DETAILED DESCRIPTION OF THE ILLUSTRATED EMBODIMENT

Figure 1:
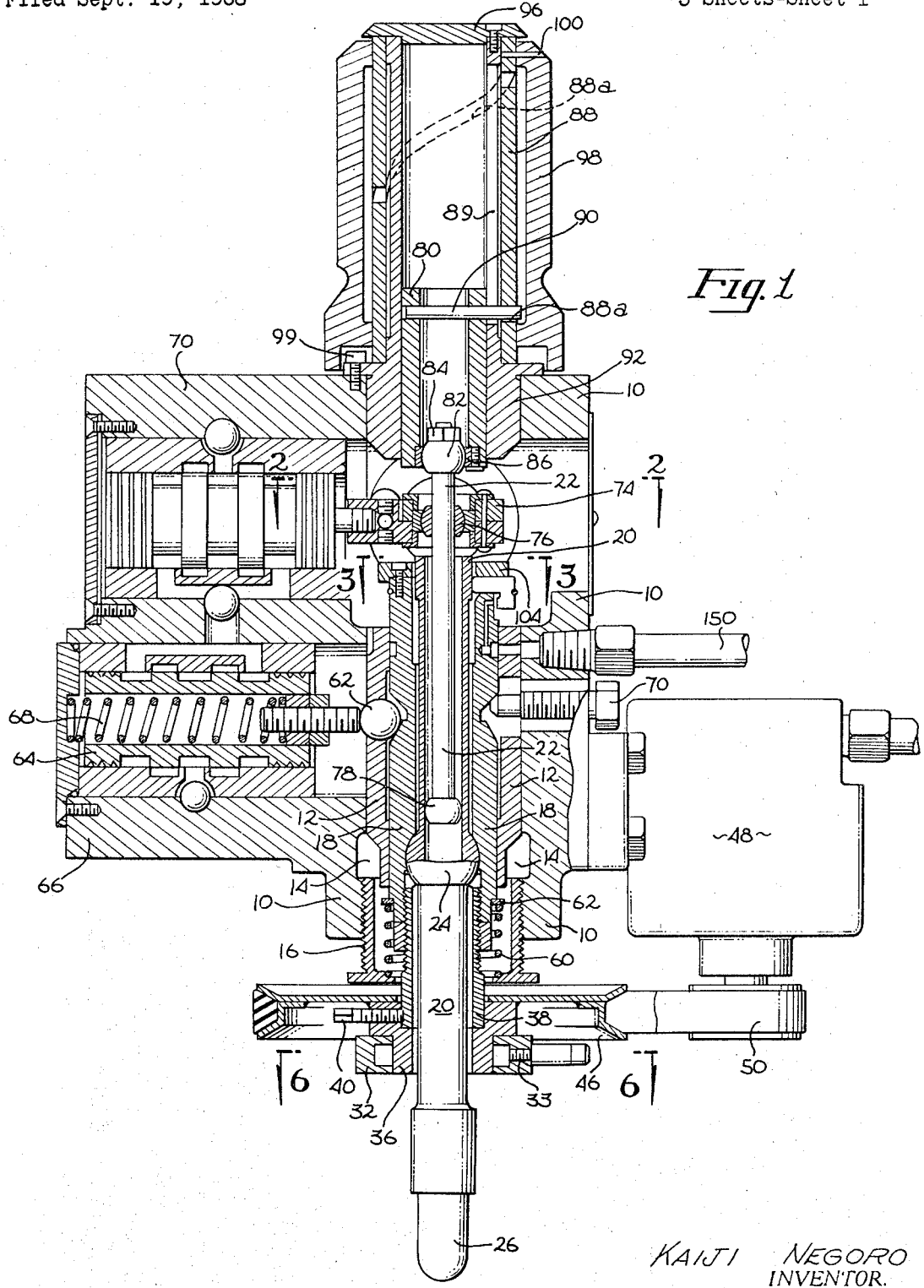
FIG. 1 is a side section of a tracer control valve mechanism which is constructed to include the manual feed rate adjustment control of the present invention.

The tracer control valve mechanism illustrated in the drawings, and as shown particularly in FIG. 1, for example, includes a frame 10 which serves to mount the mechanism in an appropriate position on the machine tool to be controlled thereby. A translator sleeve 12 is press fitted into the frame 10. Into the bottom of the frame 10 is threaded a bushing 16, which serves as an adjusting means for a compression spring 60, to be described hereinafter. An annular space 14 is provided in the frame 10 to allow the bushing 16 to be threaded up and down in adjusting the spring 60.

A tubular member, which will be referred to herein as a spindle carrier spool 18 is rotatably and slidably mounted coaxially within the sleeve 12. A stylus or spindle 20 is mounted within the spool 18. As shown in FIG. 1, for example, the upper end of the spindle 20 is tubular, and an extensible rod 22 is received in coaxial telescopic relationship within the upper tubular end of the spindle 20. The spindle 20 is pivoted to the spool 18 by means of a spherical pivot bearing 24.

A stylus 26 is mounted in the lower extremity of the spindle 20, and the stylus is biased against the contour of the template which is used in conjunction with the mechanism under discussion. The stylus 26 is biased against the template by a pair of resilient spring strips 28 and 30 (FIG. 6). The springs are mounted on a ring 32 by means of respective screws 33 and 34, the ring 32 being affixed to a further ring 36 which, in turn, is fastened to a bushing 38 by means of a set screw 40.

As shown in FIG. 6, for example, the springs 28 and 30 bear against respective pins 40 and 42. The pins are slidable in and extend through the wall of the bushing 38, and they are biased by the respective spring 28 and 30 against the side of the spindle 20. As the spindle 20 is biased by the spring loaded pins 40 and 42, it pivots in the spool 18 on its pivot bearing 24. A pulley 46 is also keyed to the bushing 38, the pulley 46 being driven by a hydraulic turning motor 48 by means of a belt drive 50.

Figure 7:
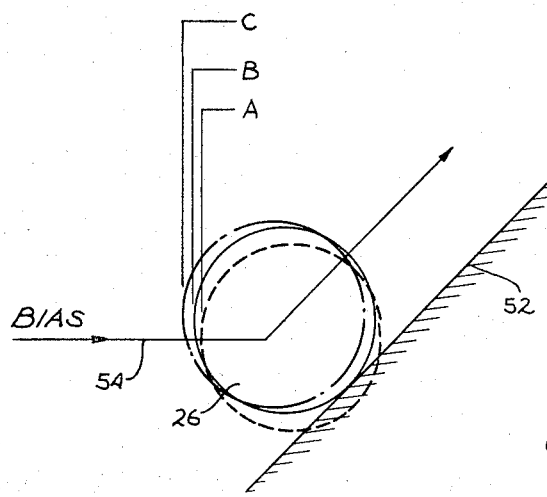
FIG. 7 is a schematic representation showing the manner in which the spindle or stylus of the mechanism of FIG. 1 is biased against the edge of an associated template.

As shown by the schematic representation of FIG. 7, the spring loaded pins 40 and 42 bias the stylus 26 against the edge of the template 52 at a direction of 45° to the point of contact between the stylus and the edge of the template, as represented by the vector 54. This provides a first component of force which is perpendicular to the point of contact and which tends to bias the stylus 26 against the edge of the template, and a second component of force which is tangential to the edge of the template, and which tends to move the assembly along the edge of the template, thereby providing for the automatic action.

Any tendency for the stylus to move from the 45° condition, as represented by the position B in FIG. 7, either results in a deflection of the stylus to the position A, or a deflection to the position C. Either of these deflections causes the turning motor 48 to be activated, as will be described, which serves to turn the assembly so as to restore the 45° relationship.

The spindle carrier spool 18 is supported on a spindle counter balance spring 60 which bears against the bottom of the bushing 16 and also against a spring washer 62, the latter being fitted around the spool 18 and bearing against a shoulder on the spool. Any movement of the stylus 26 and spindle 20 along a Z axis, for example, produces linear movement of the spindle 20 within the spool 18. Such linear movement displaces a ball 62 which is supported in an opening in the sleeve 12.

Any displacement of the ball 62 produces corresponding movements of a spool 64, in a Z-axis hydraulic valve 66, against the bias force of a spring 68 within the valve. The action of the Z-axis valve forms no part of the present invention, and such controls are well known to the art. It will be understood that Z-axis movements of the spindle 20 are translated into movements of the spool 64 of the Z-axis valve, so that corresponding hydraulic controls may be initiated. A limit adjustment for the Z-axis control operation may be provided by a usual screw 70 which is threaded through the frame 10 and through an aperture in the sleeve 12 into a mating depression in the spool 18.

The frame 10 also supports a pair of additional hydraulic valves, which may be referred to as the X-axis valve and the Y-axis valve, these being designated as 70 and 72, as best shown in FIG. 2. The respective spools in the X- and Y-axis valves 70 and 72 are coupled to the extensible rod 22 through a yoke 74. The rod 22 is pivoted within the yoke 74 by means of a cylindrical bearing 76, the bearing being maintained within the yoke, and the rod being slidable within the bearing as it is moved in and out of the spindle 20. The lower end of the rod 22 is pivoted to the interior of the spindle 20 by means of a further cylindrical bearing 78, the bearing 78 being affixed to the lower end of the rod 22 and slidable within the spindle 20.

The upper end of the extensible rod 22 is supported in a slider sleeve or bushing 80 by means of a spherical bearing 82, the latter bearing being secured to the upper end of the rod by means of a nut 84, and engaging a corresponding bearing surface 86 in the lower end of the slider 80. The slider 80, in turn, is supported in a sleeve 92 which has a longitudinal slot 89. A radial pin 90, held in the slider 80, projects through the slot 89 into a helical slot 88a in the sleeve 88. Thus, when the sleeve 88 is turned, the pin 90 moves up and down in the slot 89, producing corresponding linear movement of slider 80 within the supporting bushing or sleeve 92.

The bushing 92 is secured to the frame 10 by screws, such as the screw 94. An appropriate cover 96 is affixed to the top of the assembly, and a rate dial 98 encompasses the sleeve 88, and is secured thereto by means, for example, of a pin 100. The rate dial 98 has a tubular configuration, and it may be turned manually by the operator so as to raise or lower the slider 80, and correspondingly to adjust the extension of the rod 22 with respect to the spindle 20. An appropriate scale may be provided on the lower edge of the rate dial 98, and this scale may be calibrated so that predetermined extension settings may be established for the rod 22 with respect to the spindle 20. The dial 98 may be appropriately knurled to facilitate its manual adjustment.

The details of the yoke 74 may be in accordance with well established prior art practice. It will be appreciated that any pivotal movement of the spindle 20 about the pivot axis established by its bearing 24 produces corresponding movements of the rod 22, as it pivots on its pivot bearings 78 and 82 in response thereto. The deflection of the spindle 20 may be limited by means of a ring 104 secured to the upper end of the spool 12 by means, for example, of a screw 106. However, the deflection effect produced by the corresponding deflections of the rod 22 on the X-axis and Y-axis hydraulic valve 70 and 72 depends upon the extent to which the rod 22 is withdrawn from the spindle 20.

Figure 8:
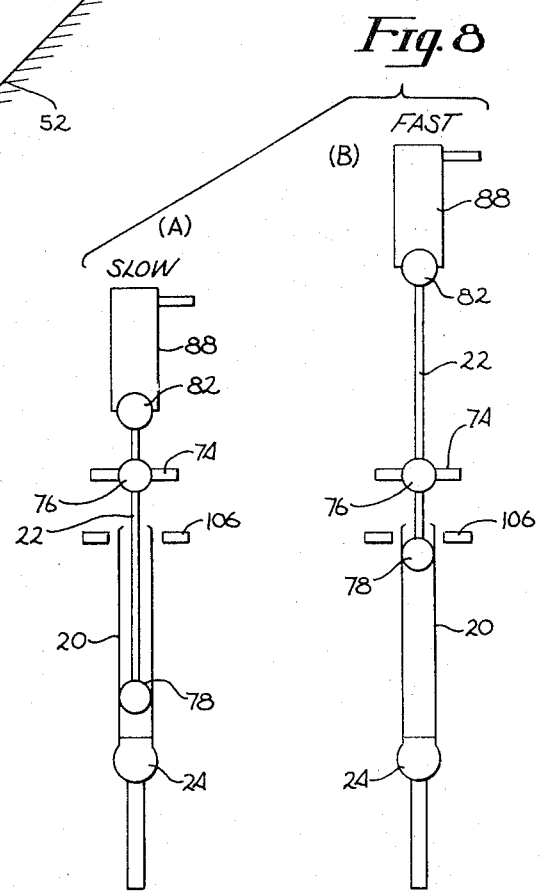
FIG. 8 shows schematically the functional characteristics of the feed rate adjustment of the invention.

For example, and as shown in FIG. 8A, when the rod-like member 22 is inserted its fullest extent down into the spindle 20, deflections of the spindle 20 between the limits established by the ring 106 produces relatively small deflections of the yoke 74 along the X- and Y-axes of the hydraulic valves 70 and 72. This is so because the X- and Y-axis valve deflections are produced by movements of the bearing 78 about a pivot point established by the bearing 82, as established by the lever arms between the bearings 76 and 78 and the constant distance between the bearings 78 and 82.

In the case shown in FIG. 8B, the rod 22 is withdrawn to its fullest extent from the spindle 20. Due to that fact, the bearing 78 approaches the bearing 76, so that the deflections of the spindle 20 between the fixed limits established by the ring 106 produce relatively large deflections of the X- and Y-axes valves 70 and 72, as compared with the deflections in the case of the setting of FIG. 8A. Therefore, a rate adjustment is provided in the assembly by selecting a predetermined extension of the rod 22 with respect to the spindle 20, and this may be established by the operator merely by turning the dial 98 to any desired setting.

Figure 9:
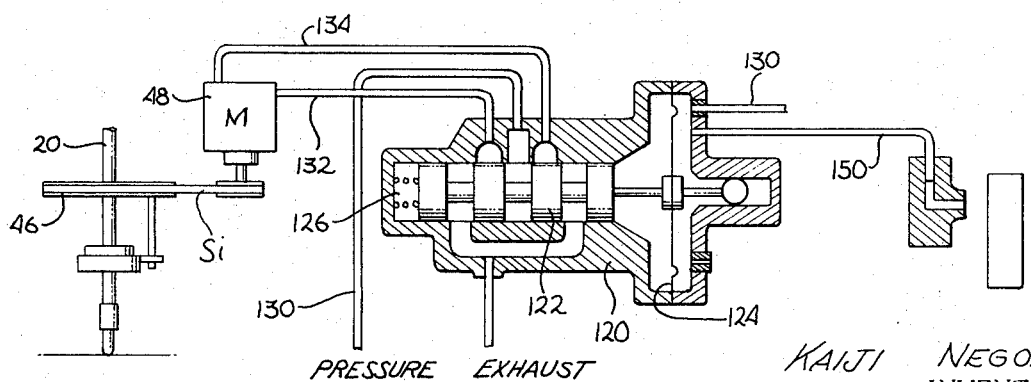
FIG. 9 is a schematic representation showing the manner in which the automatic control of the tracer valve of FIG. 1 may be effectuated.

The control of the turning motor 48, for maintaining the automatic operation of the system, is established in a manner similar to that described in the previous Rosebrook patents. As shown in FIG. 9, for example, the motor 48 is controlled by a reversing valve 120 which includes a spool 122. The spool 122, in turn, is controlled by a diaphragm 124 which moves it back and forth against the force of a spring 126. Pressurized fluid is introduced to one side of the diaphragm 124 from any appropriate source and through, for example, a pipeline 130. When the introduced pressure exceeds a predetermined amount, the diaphragm 124 causes the spool 122 to move, so as to direct pressurized fluid from a pipeline 130 to a pipeline 132. This causes the motor 48 to be driven in one direction. Movement of the spool 122 in the opposite direction, due to reduced pressure against the diaphragm 124, causes the pressurized fluid from the pipeline 130 to be introduced to the motor 48 through a further pipeline 134, so as to cause the motor to turn in the opposite direction.

Therefore, the control of the pressurized fluid introduced to the right hand side of the diaphragm 124 produces a corresponding control on the motor 48, so that it turns in one direction or the other. As mentioned above, the motor is controlled to maintain a predetermined orientation on the stylus 26, so that the mechanism may be biased against the edge of the template 52 in FIG. 7, and at the same time be caused to move along the edge of the template. This control is achieved, for example, by directing the pressurized fluid from the right hand side of the diaphragm 124 in FIG. 9 through a pipeline 150 into the interior of the mechanism as best shown in the enlarged view of FIG. 4.

The pressurized fluid enters a passageway 152 in the spool 18 in FIG. 4. A probe 160 is slidably positioned in the spool 18 and extends through an opening in the spool into engagement with the side of the spindle 20. The probe is biased against the spindle by means, for example, of a resilient retaining ring 162 (FIG. 5). The ring 162 extends around the periphery of the spool 18 and the probe. As the spindle 20 is deflected back and forth, the probe 160 moves so as to control the escape of the fluid in the passageway 152, and through a further passageway 164, the extent of which is controlled by a valve face formed on the probe 160.

Under normal operation of the mechanism, and when the spindle 20 is in an undeflected position, the probe 160 is poistioned to permit sufficient escape of the fluid so as to maintain the valve 120 of FIG. 9 in position to hold the turning motor 48 at a particular orientation. Then, any deflection of the spindle 20 in one direction causes the motor 48 to turn in a corresponding direction to compensate therefor, whereas any deflection of the spindle 20 in the opposite direction causes a counter-movement of the motor 48, again to establish equilibrium.

A feature of the mechanism of the present invention is the ability to control the rate of the mechanism without disturbing in any way the automatic control provided thereby, as described above. This is achieved because the spindle 20 continues to deflect through a constant arc, regardless of the setting of the mechanism, whereas the rate control is achieved by moving the rod 22 in and out of the spindle.

What is claimed is:

1. In combination with a tracer valve assembly for use with a machine tool for controlling a drive means therein which, in turn, controls the relative position of a workpiece and a cutting tool, said tracer valve assembly having a deflectable stylus with a tip for tracing around the contour of a template, bias means mounted for rotational movement about the axis of the stylus for exerting a deflecting force on the stylus, sensing means for detecting the deflections of the stylus, and turning means mechanically coupled to the bias means and controlled by the sensing means for controlling the angular position of the bias means with respect to the stylus axis so as to cause the bias means to exert force components on the stylus perpendicular to and tangential to the edge of the template at the point of contact between the edge and the stylus; hydraulic valve means for controlling the aforesaid drive means; an extensible rod-like member positioned coaxially in said stylus in telescopic relationship therewith; and means coupling said rod-like member to said hydraulic valve means to produce movement in said hydraulic valve means in correspondence with deflections of said stylus and in a proportion dependent upon the extension of said rod-like member with respect to said stylus.

2. The combination defined in claim 1, in which said coupling means includes a yoke member slidable on said extensible rod-like member.

3. The combination defined in claim 1 and which includes an adjustable manually controlled mechanism mounted on said assembly and coupled to said extensible rod-like member for establishing different extensions of said rod-like member with respect to said stylus.

4. The combination defined in claim 3, in which said manually controlled mechanism includes a knob rotatably mounted on said assembly, a sleeve slidable in said knob and coupled to said extensible rod-like member, and a pin coupling said sleeve to said knob to provide linear movements of said sleeve upon rotational movements of said knob.

5. The combination defined in claim 4, in which said extensible rod-like member includes first pivotal means at one end thereof slidable in said stylus and a second pivotal means pivotally coupled to the interior of said sleeve.

6. The combination defined in claim 5, and which includes third pivotal means coupled to said yoke and slidable on said extensible rod-like member.

7. The combination defined in claim 1, and which includes a ring member surrounding said stylus to limit the deflection thereof to a fixed displacement.

References Cited

UNITED STATES PATENTS

| | | | |
|---|---|---|---|
| 2,909,357 | 10/1959 | Rosebrook | 251—3 |
| 3,006,595 | 10/1961 | Rosebrook | 251—3 |
| 3,176,540 | 4/1965 | Davis et al. | 74—522 |
| 3,390,859 | 7/1968 | Rosebrook | 251—3 |
| 3,395,281 | 7/1968 | Roen et al. | 251—3 X |

WILLIAM F. O'DEA, Primary Examiner

R. GERARD, Assistant Examiner

U.S. Cl. X.R.

74—522; 251—234